United States Patent
Wengrovitz et al.

(10) Patent No.: US 8,040,873 B2
(45) Date of Patent: Oct. 18, 2011

(54) DISTRIBUTED INTEGRATION OF LEGACY PBX SYSTEM WITH SIP NETWORKS

(75) Inventors: Michael Wengrovitz, Concord, MA (US); Joao Almeida, Derry, NH (US)

(73) Assignee: Alcatel Lucent, Paris (FR)

( * ) Notice: Subject to any disclaimer, the term of this patent is extended or adjusted under 35 U.S.C. 154(b) by 1899 days.

(21) Appl. No.: 10/289,547

(22) Filed: Nov. 6, 2002

(65) Prior Publication Data

US 2003/0095569 A1    May 22, 2003

Related U.S. Application Data

(60) Provisional application No. 60/336,971, filed on Nov. 7, 2001.

(51) Int. Cl.
*H04L 12/66* (2006.01)
(52) U.S. Cl. .................. 370/352; 370/401; 370/466
(58) Field of Classification Search .......... 370/352–356, 370/401, 466
See application file for complete search history.

(56) References Cited

U.S. PATENT DOCUMENTS 6,888,839 B1 * 5/2005 Scoggins et al. ............. 370/352
6,985,478 B2 * 1/2006 Pogossiants et al. ......... 370/352
2001/0028649 A1   10/2001 Pogossiants et al.

FOREIGN PATENT DOCUMENTS

WO    WO 01/44890 A2    6/2001
WO    WO 01/73501 A2    10/2001

* cited by examiner

*Primary Examiner* — Suhan Ni
(74) *Attorney, Agent, or Firm* — Galasso & Associates, L.P.

(57) ABSTRACT

A telephony communications network supporting translation of private signaling codes for transmission over a private and/or IP network. A digital telephone emits a private signaling code for accessing a particular PBX function. An adapter coupled to the digital telephone translates the private signaling code into a SIP invite, request, response, information, notification message, and/or instant message if the private signaling code is destined for the IP network. If the private signaling code is not destined for the IP network, the private signaling code is not translated and is transmitted over the private network. If the private signaling code is destined for the IP network, the private signaling code is translated into a SIP message and transmitted over the IP network to a SIP user agent. A PBX is also coupled to the adapter that receives the private signaling codes. The codes are transmitted to the PBX for rendering a function for the digital telephone. A SIP telephone aware of the private signaling codes may also access PBX functions by translating private signaling codes into/from SIP messages.

18 Claims, 9 Drawing Sheets

DISTRIBUTED INTEGRATION OF LEGACY PBX SYSTEM WITH SIP NETWORKS

CROSS-REFERENCE TO RELATED APPLICATION(S)

This application claims the benefit of U.S. provisional application No. 60/336,971, filed Nov. 7, 2001, the content of which is incorporated herein by reference. This application also contains subject matter which is similar to the subject matter contained in U.S. application Ser. No. 10/074,340, filed Feb. 12, 2002, the content of which is also incorporated herein by reference.

FIELD OF THE INVENTION

This invention relates generally to Internet telephony, and more particularly, to integrating a legacy Private Branch Exchange (PBX) system with a Session Internet Protocol (SIP) network.

BACKGROUND OF INVENTION

Legacy Private Branch Exchange (PBX) systems allow a number of users to share a smaller set of telephone lines that are connected to a public telephone network (PSTN). Since it has been more cost effective to purchase a PBX switch and deploy it within a facility than pay monthly access fees for connecting every telephone to a switch in a public network, usage of legacy PBXs is currently widespread.

With the advent of Session Initiation Protocol (SIP), a powerful signaling protocol for creating, modifying, and terminating multimedia sessions, including Internet telephone calls between one or more SIP-endpoints, many legacy PBX users want to migrate portions of the SIP technology into their existing infrastructure so that they can (1) retain all of their existing functionality, (2) take advantage of the many services SIP provides and (3) avoid the cost of purchasing a new IP-PBX system and its associated equipment (e.g., user sets) that already (or can as an option) internally incorporates the SIP technology. Details about the SIP signaling protocol are set forth in Internet Engineering Task Force Request for Comment 2543 entitled "SIP: Session Initiation Protocol," March 1999 (hereinafter referred to as RFC 2543), which is incorporated herein by reference, SIP provides an alternative to PBX- or H.323-signaled telephony.

Accordingly, there is a need for a hybrid system that externally integrates a PBX system with a SIP network.

SUMMARY OF THE INVENTION

The present invention provides for an adapter, referred to as a SIP Adapter Module (SAM) that couples a PBX system to a SIP network. The adapter couples the PBX switch with a telephone set. Further, the adapter has a port for coupling to a SIP network. The adapter has a converter for translating between the telecommunication signalling and voice in the PBX domain, referred to as private digital signalling and voice (PDSV), and the packetized SIP signalling and voice in the IP network domain. This enables SIP User Agents to access the telephone sets and features in an existing legacy PBX system, to make and place calls to and from the public switched telephone network (PSTN), and to continue to access other SIP User Agents and services on the SIP network. The present invention is particularly advantageous in that existing legacy PBX switches and telephone sets can be fully integrated with the SIP network with no changes to the PBX or telephone set.

According to one embodiment of the invention, a SIP adapter module (SAM) of the invention is connected directly to each existing telephone set, to the existing PBX switch, and to the SIP network via IP. The SAM is preferably located in close proximity to the telephone set to which it is connected. In some cases, if the existing telephone sets have an internal cavity, the SAM may be located within the telephone set itself. Alternately, the SAM may be located remotely from the telephone set to which it is connected.

According to another embodiment, the invention is directed to a telephony communications network that includes a communications interface receiving an application layer control protocol message transmitted by a first telephony unit, an adapter coupled to the communications interface, the adapter translating the application layer control protocol message into a telephony signaling code, and a second telephony unit coupled to the adapter for receiving the telephony signaling code.

According to another embodiment, the invention is directed to a telephony communications network that includes a first telephony unit for generating a telephony signaling code, an adapter coupled to the first telephony unit, the adapter translating the telephony signaling code into an application layer control protocol message, and a communications interface coupled to the adapter for transmitting the message over a communications network.

According to another embodiment, the invention is directed to a telephony communications network that includes a first telephony unit for generating a first telephony signaling code, a PBX coupled to the first telephony unit for converting the first telephony signaling code into a second telephony signaling code, an adapter coupled to the PBX for translating the second telephony signaling code into an application layer control protocol message, a first communications interface coupled to the adapter for transmitting the second telephony signal code over a first communications network, and a second communications interface coupled to the adapter for transmitting the message over a second communications network.

According to another embodiment, the invention is directed to a telephony communications network that includes a communications interface receiving a first application layer control protocol message transmitted by a first telephony unit, a server coupled to the communications interface for receiving the first application layer control protocol message and generating a second application layer control protocol message to the first telephony unit and a third application layer control protocol message, and an adapter for receiving the third application layer control protocol message, for generating a fourth application layer protocol message to the first telephony unit wherein the first telephony unit generates a fifth application layer control protocol message to the adapter, and for translating the fifth application layer control protocol message into a first telephony signaling code.

According to another embodiment, the invention is directed to a telephony communications network that includes a telephony unit and an adapter coupled to the telephony unit, the adapter comprising a signaling interface receiving a telephony signaling code from a telephony unit, a processor coupled to the signaling interface, the processor configured to translate the telephony signaling code into an application layer control protocol message, and a network interface coupled to the processor for transmitting the message over a communications network.

According to another embodiment, the invention is directed to a telephony communications method that includes receiving an application layer control protocol message transmitted by a first telephony unit, translating the application layer control protocol message into a telephony signaling code, transmitting the telephony signaling code, and receiving the telephony signaling code.

According to another embodiment, the invention is directed to a telephony communications method that includes generating a telephony signaling code, translating the telephony signaling code into an application layer control protocol message, and transmitting the application layer control protocol message over the communications network.

According to another embodiment, the invention is directed to a telephony communications method that includes generating a first telephony signaling code, converting the first telephony signaling code into a second telephony signaling code, translating the second telephony signaling code into an application layer control protocol message, transmitting the second telephony signal code over a first communications network, and transmitting the message over a second communications network.

According to another embodiment, the invention is directed to a telephony communications method that includes receiving a first application layer control protocol message transmitted by a first telephony unit, generating a second application layer control protocol message to a first telephony unit, generating a third application layer control protocol message to an adapter, generating a fourth application layer protocol message to the first telephony unit, generating a fifth application layer control protocol message to the adapter, and translating the fifth application layer control protocol message into a first telephony signaling code.

It should be appreciated that the present invention allows conventional digital telephone sets and SIP user agents to enjoy both the full set of PBX functionality provided by existing SIP servers and SIP services provided by existing SIP servers.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION OF THE SPECIFIC EMBODIMENTS

Figure 1:
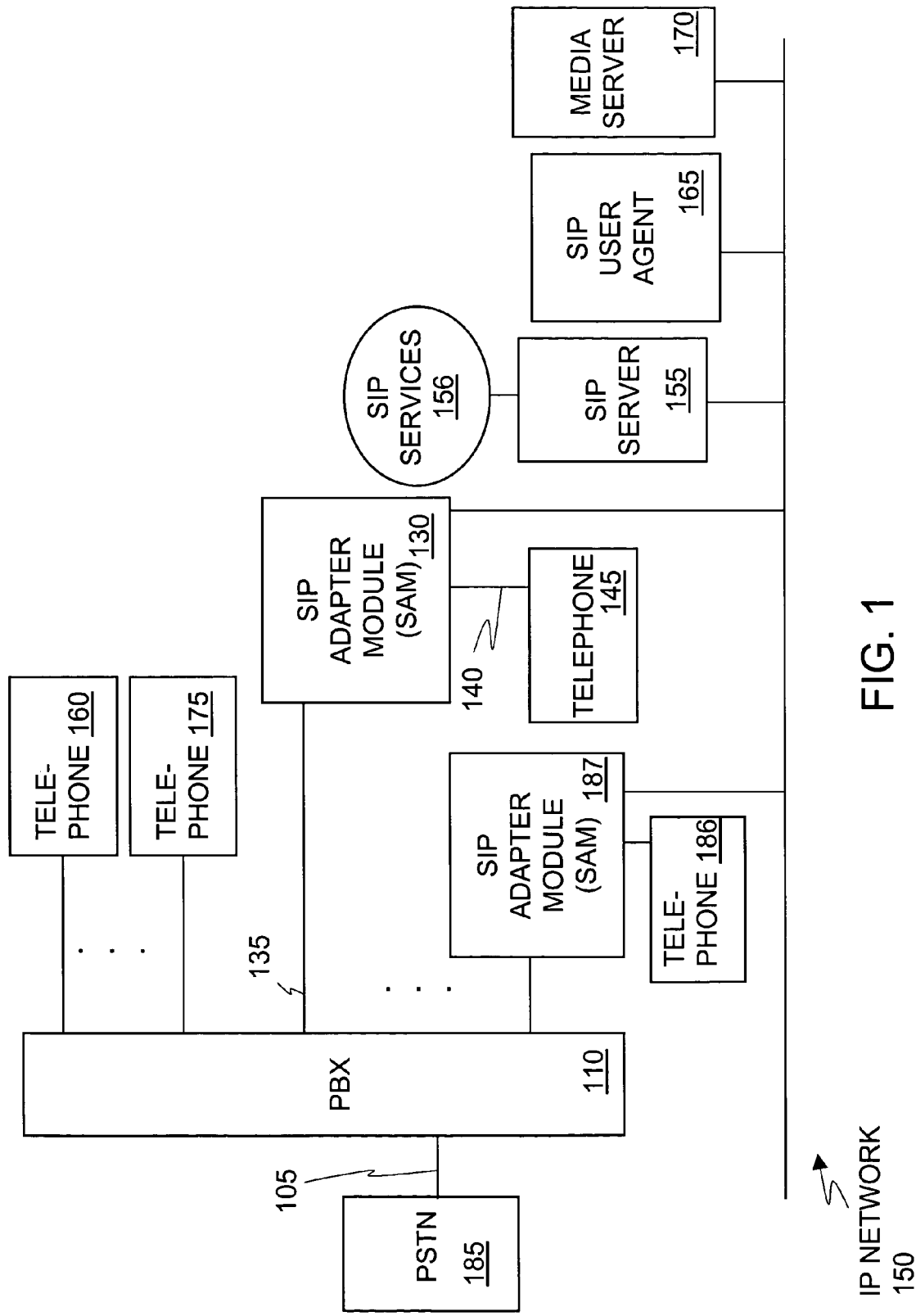
FIG. 1 is a schematic block diagram of a distributed integration system for coupling a PBX and a telephone to an IP network using a SIP Adapter Module (SAM) according to one embodiment of the invention.

FIG. 1 is a schematic block diagram of a distributed integration system for coupling a PBX and a telephone to an IP network using a SIP Adapter Module (SAM) according to one embodiment of the invention. The system includes telephone 145 initiating a call that is directed to SIP user agent 165 over a IP network 150, such as, for example, a wide area network, and over a private network 140, such as, for example, a local area network, private network and/or the like. Communication between telephone 160, 175, 186, 145, PBX 110 and SAM 130 use private digital signaling and voice (PDSV) to exchange signaling and voice.

The system also includes SIP user agent 165 initiating a call that is directed to telephone 145 over IP network 150, such as, for example, a wide area network, and over private network 140, such as, for example, a local area network, private network and/or the like, using an IP signal, where the IP signal is preferably a SIP message and/or a Real-Time Transport Protocol (RTP) for media exchange.

The system also includes PSTN 185 initiating a call that is directed to SIP user agent 165 over IP network 150 and networks 135, 105, using a PBX 110, and SIP Adapter Module (SAM) 130. The system also includes SIP user agent 165 initiating a call that is directed to PSTN 185 over IP network 150 and networks 135, 105, using a PBX 110 and SAM 130.

The system also includes PSTN 185 initiating a call that is directed to telephone 145 over networks 105, 135, 140, PBX 110, and SAM 130. The telephone 145, network 135, 140, and PBX 110 preferably adhere to private protocols. The network 105 preferably adhere to public protocols. The system also includes telephone 145 initiating a call that is directed to PSTN 185 over networks 135, 140, 105, PBX 110, and SAM 130. The telephone 145, network 135, 140, and PBX 110 preferably adhere to private protocols. The network 105 preferably adhere to public protocols.

In a configuration with a plurality of SAMs, the plurality of SAMs may be located within a SIP Adapter Chassis (SAC) that shares internal processing, communication and other resources.

The SIP user agent 165 is preferably a SIP-enabled telephone, hand phone, personal computer, switch, router, handset, input/output cable, keyboard, keypad, display and/or the like for receiving and/or transmitting voice and/or data and allowing a voice and/or data conversation between a caller and callee. A SIP user agent and/or telephone may make and/or receive a call from another SIP user agent and/or telephone. The telephones 145, 160, 175, 186 are preferably a digital protocol device such as, for example, a legacy digital phone and/or the like. Telephone 145, 160, 175, 186 may also be an analog, IP and/or a software phone and/or the like. PSTN 185 is preferably a public switched telephone network.

Telephones 160, 175 are preferably non-SAM enabled telephones coupled to PBX 110. SAMs 130, 187 are preferably one of a plurality of SAM devices coupled to PBX 110.

The communication system of FIG. 1 further includes SIP server 155 preferably routing SIP calls between SAM 130 and a SIP user agent, such as SIP user agent 165. SAM 130 preferably translates calls to/from PBX 110 from/to IP network 150, translates calls to/from PBX 110 from/to telephone 145, and translates calls to/from telephone 145 from/to IP network 150. SIP user agent 165 may also subscribe to SAM 103 so that SIP user agent 165 will no longer need to use SIP server 155 to get calls to/from SAM 130. SIP server 155 is preferably a SIP proxy server, SIP redirect server and/or the like. The SIP server 155 further makes available to SIP user agent 165, PSTN 185 and telephone 145 various SIP services 156 such as, for example, call forking, caller preferences, encryption, authentication, firewall control, billing, call routing, and the like.

Media server 170 preferably provides storage, network interfaces, memory and support for all forms of multimedia communication and/or the like.

According to one embodiment of the invention, SAM 130 and telephone 145 reside in two separate machines coupled to each other over private network 140. According to another embodiment of the invention, SAM 130 and telephone 145 reside in a single machine.

In general, SAM 130 provides for the translation between IP and PDSV, where the IP may be SIP signaling plus Real-Time Transport Protocol (RTP) media, and the PDSV may be Private Digital Signaling and Voice protocol used by the PBX to exchange signaling and voice to/from telephone sets 160, 175, 145, 186.

The translation, which is traditional table lookup and/or algorithmic, between PDSV and IP occurs when SIP user agent 165 is communicating through SAM 130 to the telephone 145 or through the SAM to another telephone or PSTN via the PBX 110. When telephone 145 is in communication with PBX 110, no translation between PDSV and IP occur.

Figure 2:
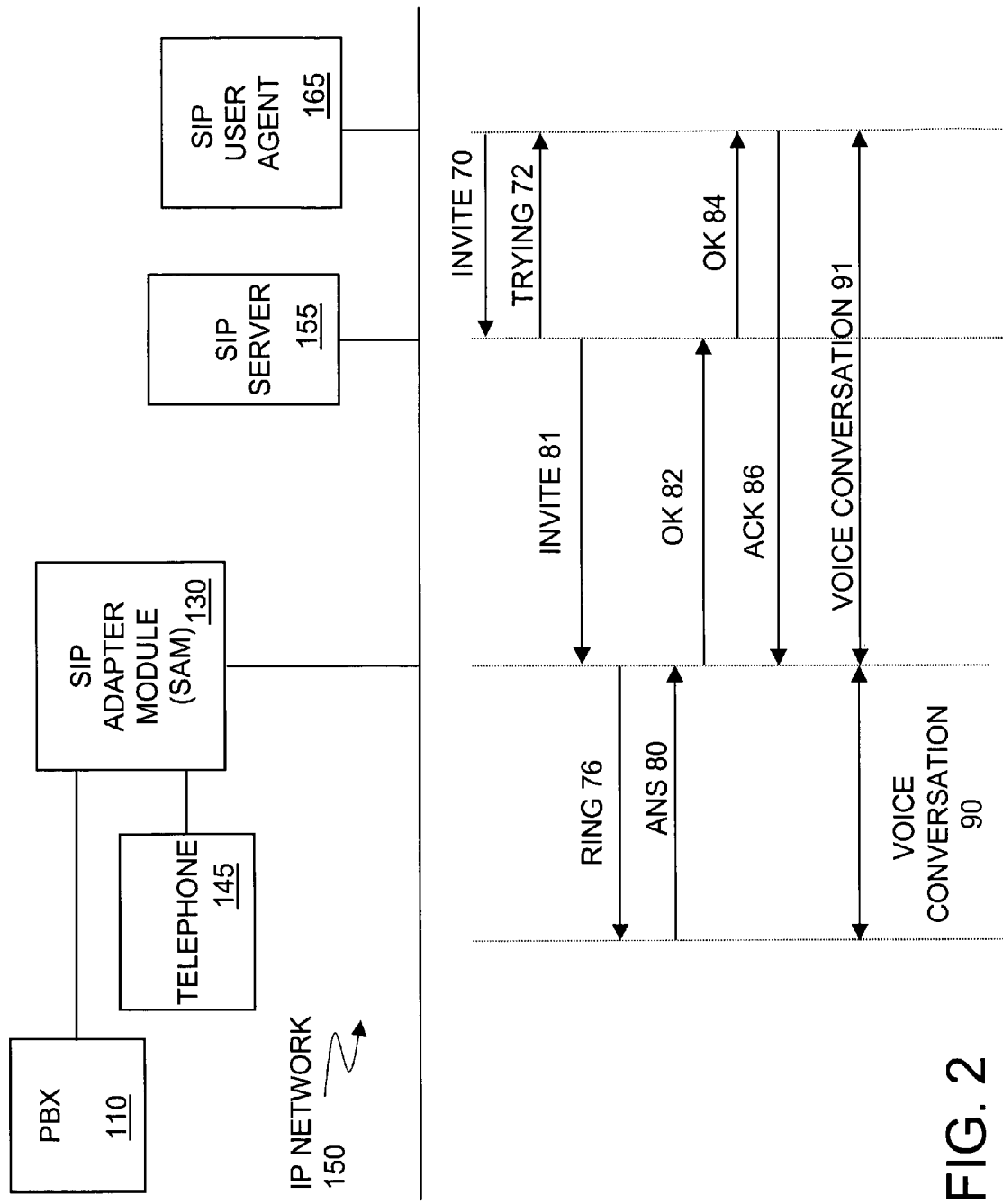
FIG. 2 is a functional block diagram of a process for a telephone to receive a SIP call using a SAM according to one embodiment of the invention.

FIG. 2 is a functional block diagram of a process for a telephone to receive a SIP call using a SAM according to one embodiment of the invention. In step 70 of the illustrated embodiment, SIP server 155 receives an IP INVITE message from SIP user agent 165, requesting to be connected to telephone 145. SIP server 155 uses the INVITE information contained in the INVITE message to determine a most correct address to which to route the connection request. The INVITE message may, for example, include standard routing information in the "From:", "To:", "Contact:" and/or other fields within the INVITE message header.

The SIP server 155 accepts the INVITE message and in step 72, transmits an IP TRYING message to SIP user agent 165 to indicate that action is being taken on behalf of the call, but that telephone 145 has not yet been located. SAM 130 translates the SIP signal into a PDSV code and, in step 76, issues the appropriate PDSV RING signal to notify telephone 145 that an INVITE message has been received by SAM 130 for telephone 145. SAM 130 may notify telephone 145 of the message by, for example, causing the user's telephone to ring. In step 76, SAM 130 preferably also sends other PDSV data to telephone 145, such as, for example, caller-ID data and/or the like which has been derived through translation of SIP header information in the INVITE message of step 81.

If telephone 145 answers the RING by, for example, answering the user's telephone, telephone 145 responds to the RING in step 80 with the appropriate PDSV answer code (ANS) which is returned to SAM 130. SAM 130 replies to the SIP server 155 in step 82 with a SIP OK message to indicate to SIP server 155 that telephone 145 is ready for voice conversation and in step 84, SIP server 155 preferably sends a SIP OK message to SIP user agent 165 to indicate that telephone 145 is ready for voice conversation. In step 86, SIP user agent 165 preferably confirms that it received the OK message in step 84 and is ready for voice conversation by transmitting an SIP acknowledgement (ACK) message to SAM 130. Once the ACK has been received by SAM 130 in step 86, voice and/or data communication preferably ensues between SIP user agent 165 and telephone 145 in step 90, 91.

Consequently, in step 91, IP voice is preferably received from SIP user agent 165 at SAM 130 and SAM 130 preferably translates the IP voice into a suitable PDSV voice to transmit to telephone 145 in step 90. Likewise, in step 90, telephone 145 preferably sends PDSV voice to SAM 130 and SAM 130 preferably translates the PDSV voice into IP voice, which is then transmitted to SIP user agent 165 in step 91. The transfer of information here preferably occurs in a manner that is transparent to SIP user agent 165 and telephone 145. In addition, suitable digital encryption and signature techniques conventional in the art may be employed to assure authorized access to data, and to further ensure that the data are authentic.

Figure 3:
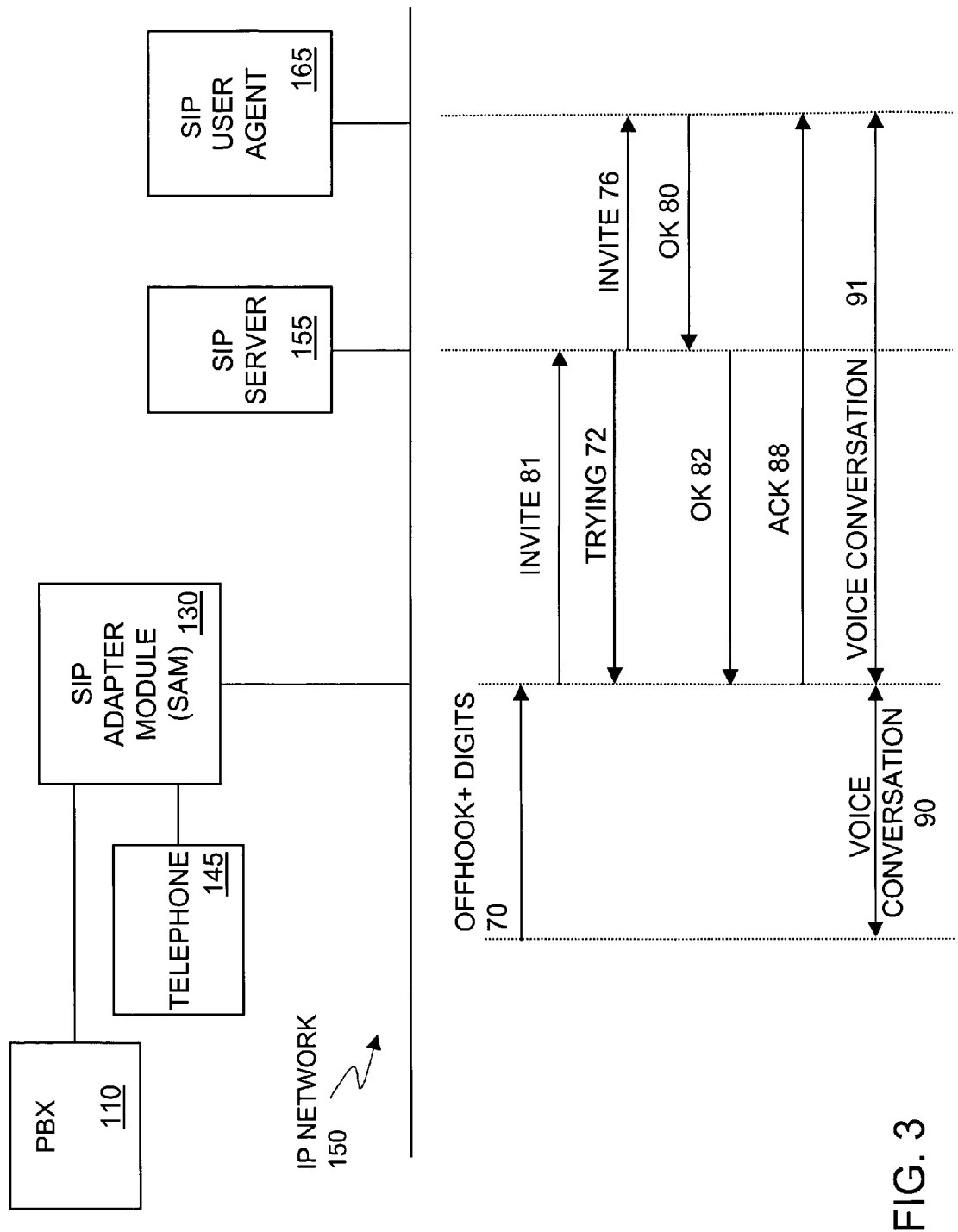
FIG. 3 is a functional block diagram of a process for a telephone to make a SIP call using a SAM according to one embodiment of the invention.

FIG. 3 is a functional block diagram of a process for a telephone to make a SIP call using a SAM according to one embodiment of the invention. In step 70, SAM 130 receives PDSV OFFHOOK+DIGITS code from the telephone 145, preferably requesting to be connected to SIP user agent 165. SAM 130 preferably contains a standard dial-plan which recognizes the PDSV OFFHOOK+DIGITS code in step 70 to determine whether to forward code to SIP user agent 165 or to some other end-point and/or the like. In step 81, since telephone 145 is requesting to be connected to SIP user agent 165, SAM 130 preferably generates a SIP INVITE message to SIP server 155. SIP server 155 uses the INVITE information contained in the INVITE message of step 81 to determine a most correct address to which to route the connection request. The INVITE message of step 81 may, for example, include standard routing information in the "From:", "To:", "Contact:" and/or other fields within the INVITE message header. INVITE of step 81 may also be forwarded through additional SIP Servers (not shown) or directly to SIP user agent 165.

SIP server 155 accepts the SIP INVITE message of step 81 and in step 72, sends a SIP TRYING message to SAM 130 that SIP server 155 is searching for SIP user agent 165. Once SIP server 155 locates SIP user agent 165, it issues a SIP INVITE signal in step 76 to notify SIP user agent 165 that it has been called. In step 76, SIP server 155 preferably also sends other data to SIP user agent 165, such as, for example, caller-ID data.

If SIP user agent 165 answers the call SIP user agent 165 preferably responds with an appropriate SIP OK message to SIP server 155 in step 80 and, in step 82, SIP server 155 preferably replies to SAM 130 with a SIP OK message to indicate to SAM 130 that SIP user agent 165 is ready for voice conversation. In step 88, SAM 130 preferably acknowledges (ACK), with a SIP ACK to SIP user agent 165 signifying that the connection is ready and in step 90, 91 data and/or voice ensues between SIP user agent 165 and telephone 145.

Consequently, in step 90, PDSV voice is preferably received from telephone 145 at SAM 130 and SAM 130 preferably translates the PDSV voice to IP voice and transmits the voice to SIP user agent 165 in step 91. Likewise, SIP user agent 165 preferably sends a suitable IP voice to SAM 130 and SAM 130 preferably translates the IP voice into a PDSV voice which is transmitted to telephone 145. The transfer of information here preferably occurs in a manner that is transparent to the SIP user agent 165 and telephone 145. In addition, suitable digital encryption and signature techniques conventional in the art may be employed to assure authorized access to data, and to further ensure that the data are authentic.

Figure 4A:
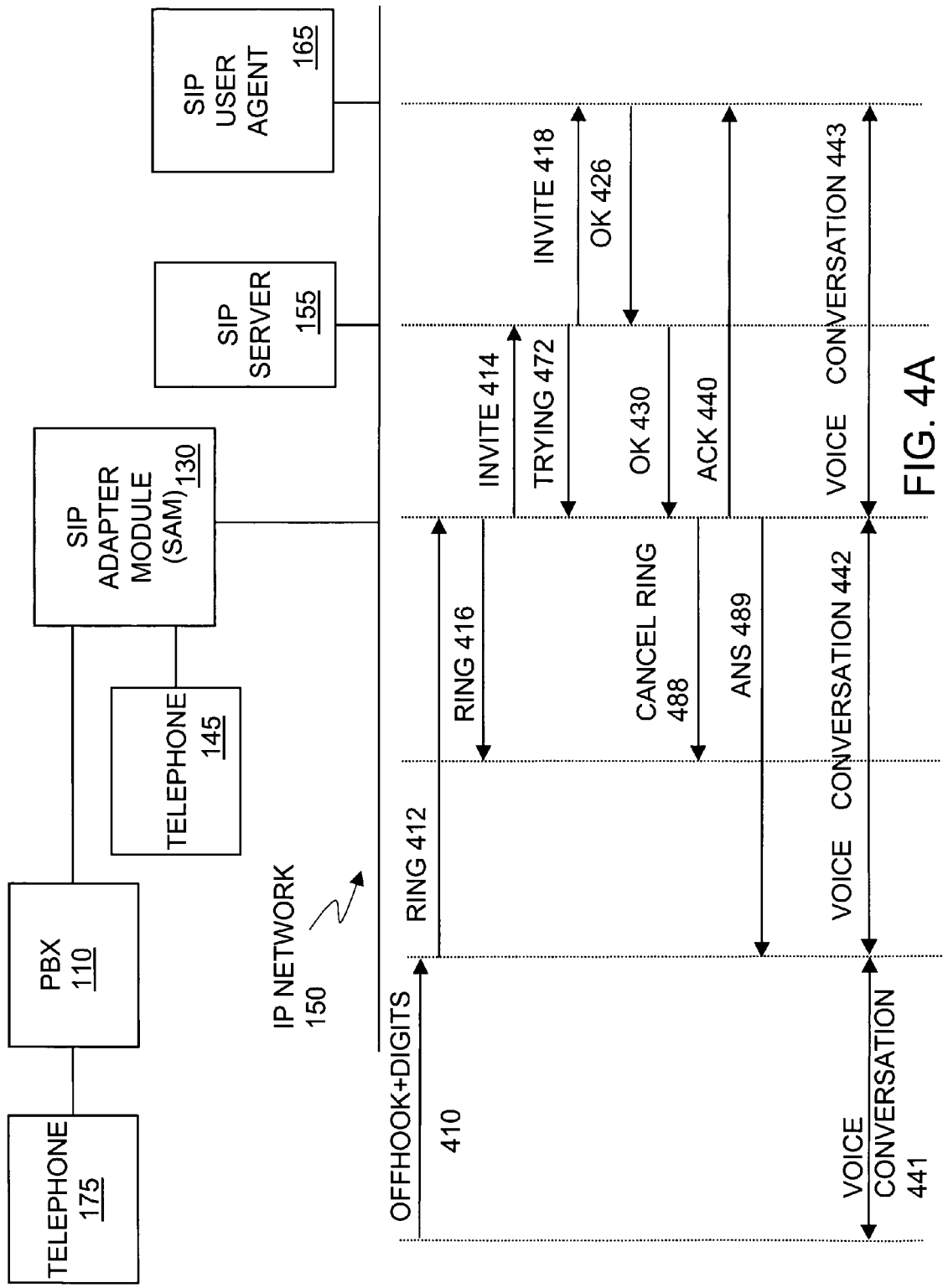
FIG. 4A is a functional block diagram of a process for a SIP user agent to answer a call that has been forked to it and a telephone set by using a SAM according to one embodiment of the invention.

FIG. 4A is a functional block diagram of a process for a SIP user agent to answer a call that has been forked to it and a telephone set by using a SAM according to one embodiment of the invention. In step 410, PBX 110 receives PDSV OFF-HOOK+DIGITS code from telephone 175, preferably requesting to be connected to SIP user agent 165 or telephone 145, whichever one answers first. In step 412, PBX 110 preferably issues a PDSV RING code to SAM 130. SAM 130 preferably contains a standard dial-plan that determines whether to forward the message to IP user agent 165 and/or telephone 145 and/or some other end-point and/or the like. In this case, SAM 130 preferably determines that the request is to attempt connect to both telephone 145 and SIP user agent 165 and to establish a voice connection to whichever answers first. In step 416, SAM 130 preferably issues a PDSV RING code to telephone 145. In step 414, which may occur concurrently with step 416, SAM 130 issues a SIP INVITE message to SIP server 155 for SIP user agent 165. SIP server 155 uses the SIP INVITE information contained in the step 414 INVITE message to determine a most correct address to which to route the connection request. The INVITE message of step 414 may, for example, include standard routing information in the "From:", "To:", "Contact:" and/or other fields within the INVITE message header. The INVITE of step 414 may also be forwarded through additional SIP Servers (not shown) or directly to telephone 165.

SIP server 155 accepts the SIP INVITE message of step 414 and then issues a SIP TRYING message to SAM 130 to indicate to SAM 130 that SIP server 155 is attempting to locate SIP user agent 165. Once SIP user agent 165 is located, SIP server 155 issues a SIP INVITE message to SIP user agent 165 in step 418 to indicate to SIP user agent that it is being called from PBX 110. In step 418, SIP server 155 preferably notifies SIP user agent 165 of the INVITE by, for example, causing the user's telephone to ring. In step 418, SIP server 155 preferably also sends other data to SIP user agent 165, such as, for example, caller-ID data.

If SIP user agent 165 answers its INVITE of step 418 prior to telephone 145 answering its RING in step 416, SIP server 155 will respond to SAM 130 in step 430 that it received a SIP OK from SIP user agent 165 indicating that SIP user agent 165 is ready for voice conversation. Thereafter, SAM 130 will preferably stop or cancel its PDSV RING to telephone 145 in step 488, SAM 130 will preferably issue a SIP acknowledge (ACK) to SIP user agent 165 that SAM 130 is ready for voice conversation in step 440, and SAM 130 will preferably issue a PDSV answer (ANS) to PBX 110 that SAM 130 is ready for voice conversation in step 489. In step 441, 442, 443 data and/or voice ensues between SIP user agent 165 and telephone 175.

Consequently, PDSV voice is preferably received from telephone 175 at PBX 110, PBX 110 preferably issues the PDSV voice to SAM 130, SAM 130 preferably translates the PDSV voice to IP voice which is then transmitted to SIP User Agent 165. Likewise, SIP user agent 165 preferably transmits suitable IP voice to SAM 130, SAM 130 preferably translates the IP voice into a PDSV voice, SAM 130 preferably transmits the PDSV voice to PBX 110, and PBX 110 preferably transmits the PDSV voice to telephone 175. The transfer of information here preferably occurs in a manner that is transparent to the SIP user agent 165, PBX 110, and telephone 175. In addition, suitable digital encryption and signature techniques conventional in the art may be employed to assure authorized access to data, and to further ensure that the data are authentic.

Figure 4B:
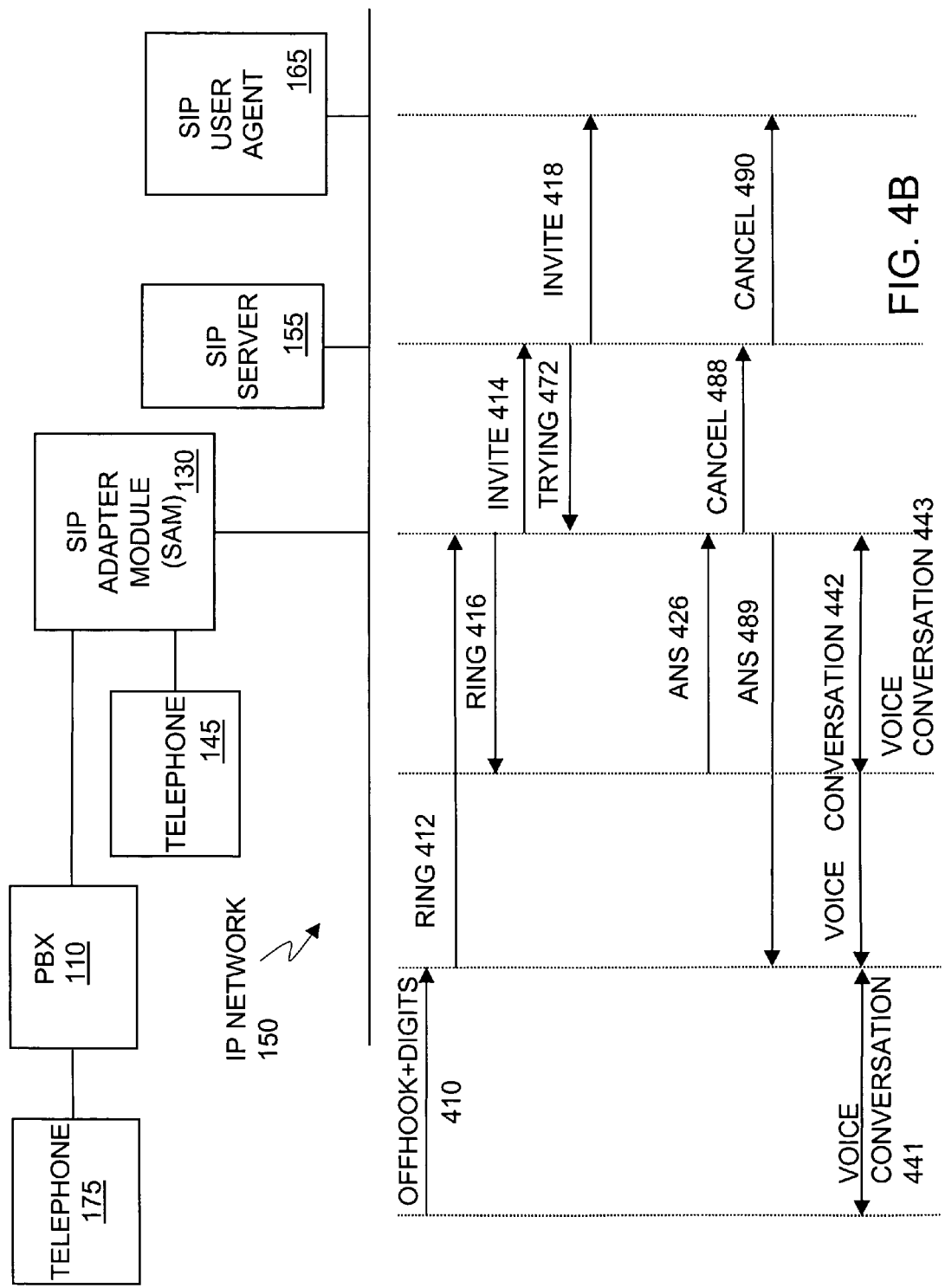
FIG. 4B is a functional block diagram of a process for a telephone set to answer a call that has been forked to it and a SIP user agent by using a SAM according to one embodiment of the invention.

FIG. 4B is a functional block diagram of a process for a telephone set to answer a call that has been forked to it and a SIP user agent by using a SAM according to one embodiment of the invention. In step 410, PBX 110 receives a PDSV OFFHOOK+DIGITS code from telephone 175, preferably requesting to be connected to SIP user agent 165 or telephone 145, whichever one answers first. In step 412, PBX 110 preferably issues a PDSV RING message to SAM 130. SAM 130 preferably contains a standard dial-plan that determines whether to forward the message to SIP user agent 165 and/or telephone 145 and/or some other end-point and/or the like. In this case, SAM 130 preferably determines that the request is to attempt connect to both telephone 145 and SIP user agent 165 and to establish a voice connection to whichever answers first. In step 416, SAM 130 preferably issues a PDSV RING code to telephone 145. In step 414, which may occur concurrently with step 416, SAM 130 preferably issues a SIP INVITE message to SIP server 155 for SIP user agent 165. SIP server 155 uses the SIP INVITE information contained in the INVITE message of step 414 to determine a most correct address to which to route the connection request. The INVITE message of step 414 may, for example, include standard routing information in the "From:", "To:", "Contact:" and/or other fields within the INVITE message header. The INVITE of step 414 may also be forwarded through additional SIP Servers (not shown) or directly to telephone 165.

SIP server 155 accepts the SIP INVITE message of step 414 and then issues a SIP TRYING message to SAM 130 to indicate to SAM 130 that SIP server 155 is attempting to locate SIP user agent 165. Once SIP user agent 165 is located, SIP server 155 issues a SIP INVITE to SIP user agent 165 in step 418 to indicate to SIP user agent 165 that it is being called by PBX 110. In step 418, SIP server 155 preferably notifies SIP user agent 165 of the INVITE by, for example, causing the user's telephone to ring. In step 418, SIP server 155 preferably also sends other data to SIP user agent 165, such as, for example, caller-ID data.

This embodiment is similar to that of FIG. 4A; however, in step 426, telephone 145 preferably answers its PDSV RING code of step 416 signifying that it is ready for voice conversation prior to SIP user agent 165 answering its SIP INVITE message of step 418. Consequently, in step 488, SAM 130 will preferably cancel its SIP INVITE of step 414 to SIP server 155 and, in step 490, SIP server 155 will preferably cancel its SIP INVITE of step 418 to SIP user agent 165. Thereafter, SAM 130 issues a PDSV answer (ANS) to PBX 110 that telephone 145 is ready for voice conversation and in step 441, 442, 443, voice conversation will ensue between telephone 175 and telephone 145.

Consequently, PDSV voice is preferably received from telephone 175 at PBX 110, PBX 110 preferably issues its received PDSV voice to SAM 130, and then SAM 130 preferably forwards PDSV voice to telephone 145. Likewise, telephone 145 preferably transmits a suitable PDSV voice to SAM 130, SAM 130 preferably issues PDSV voice to PBX 110 and PBX 110 preferably delivers its received voice code to telephone 175. The transfer of information here preferably occurs in a manner that is transparent to the telephone 145, PBX 110, and telephone 175. In addition, suitable digital encryption and signature techniques conventional in the art may be employed to assure authorized access to data, and to further ensure that the data are authentic.

Figure 5:
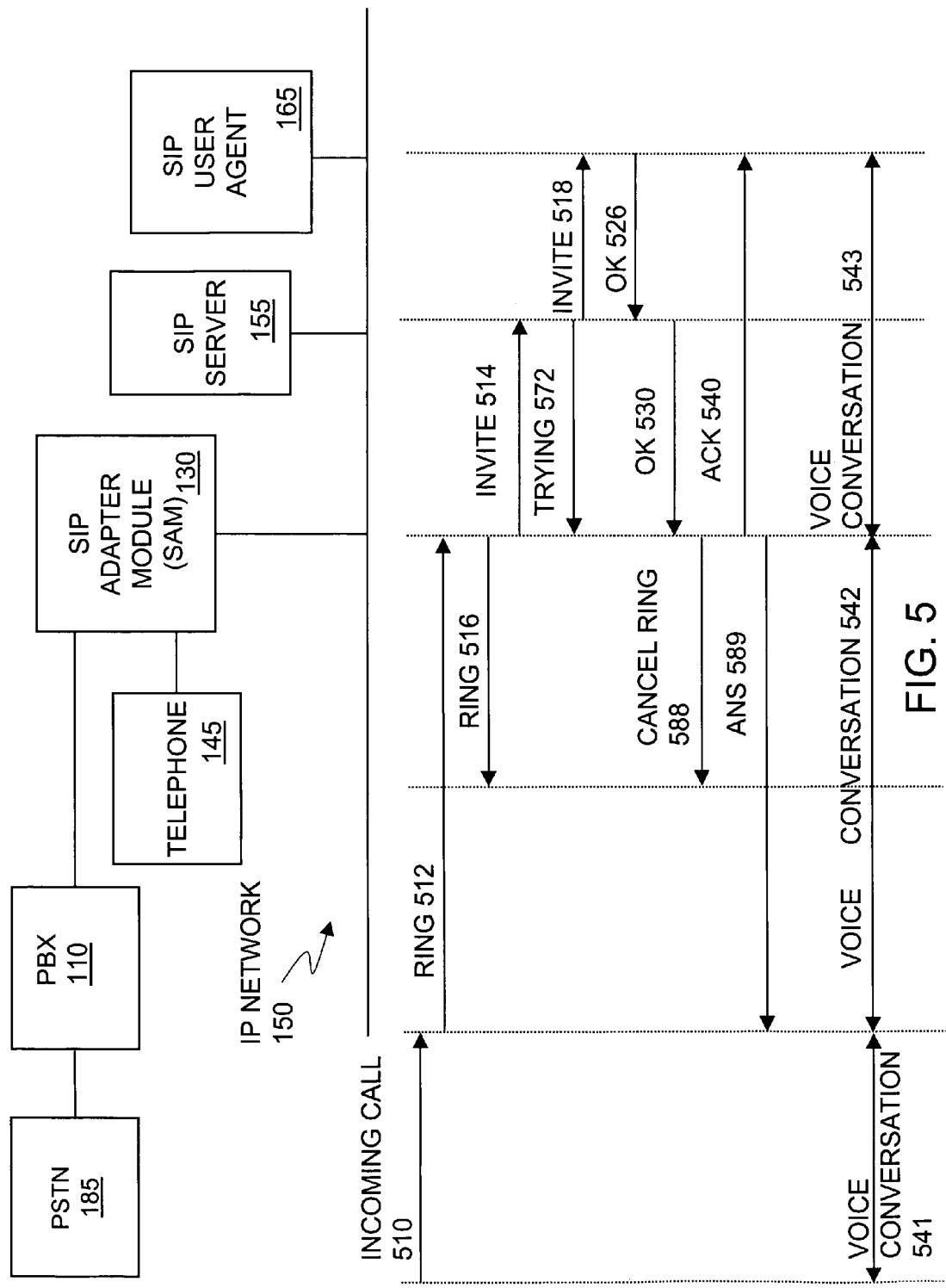
FIG. 5 is a functional block diagram of a process for an incoming call from a PSTN to be gatewayed to a SIP user agent by a SAM according to one embodiment of the invention.

The forking process of FIGS. 4A and 4B can also be performed when a call is received by the PBX 110 from a public switched telephone network PSTN 185. FIG. 5 is a functional block diagram of a process for an incoming call from a PSTN to be gatewayed to a SIP user agent by a SAM according to one embodiment of the invention. In step 510, PBX 110 receives an INCOMING CALL code from PSTN 185. In step 512, PBX 110 preferably issues a PDSV RING to SAM 130 indicating that an incoming call has been received by PBX 110 which is destined for the user associated with the telephone 145. SAM 130 preferably contains a standard dialplan that determines whether to forward the message to SIP user agent 145 and/or some other end-point and/or the like. In this case, SAM 130 preferably forks a PDSV RING to telephone 145 in step 516 and a SIP INVITE message to SIP server 155 in step 514. SIP server 155 uses the SIP INVITE information contained in the INVITE message of step 514 to determine a most correct address to which to route the connection request. The SIP INVITE message of step 514 may, for example, include standard routing information in the "From:", "To:", "Contact:" and/or other fields within the INVITE message header. The INVITE of step 514 may also be forwarded through additional SIP Servers (not shown) or directly to telephone 165.

SIP server 155 accepts the SIP INVITE message from step 514 and then issues a SIP TRYING message to SAM 130 to indicate to SAM 130 that it is looking for SIP user agent 165. When SIP server 155 locates SIP user agent 165, SIP server 155 issues a SIP INVITE message to SIP user agent 165 in step 518. In step 518, SIP server 155 preferably notifies SIP user agent 165 of the INVITE by, for example, causing the user's telephone to ring. In step 518, SIP server 155 preferably also sends other data to telephone 165, such as, for example, caller-ID data.

In step 526, SIP user agent 165 responds to the SIP server INVITE of step 518 with a SIP OK message indicating to SIP server 155 that SIP user agent 165 is ready for voice conversation. SIP user agent 165 may indicate a SIP OK by, for example, answering the user's telephone. In step 530, SIP server 155 preferably indicates the receipt of the SIP OK from SIP user agent 165 in step 526 with a SIP OK to SAM 130 to indicate to SAM 130 that SIP user agent 165 is ready for voice conversation. Since SIP user agent 165 responded with a SIP OK in step 526 and SIP server 155 responded with an OK in step 530, SAM 130 cancels or stops its PDSV RING of step 516 in step 588. As such, in step 540, SAM 130 preferably acknowledges (ACK) to SIP user agent 165 that it is ready for voice conversation and in step 589, SAM 130 PDSV answers (ANS) PBX 110 signifying that it is ready for voice conversation. Consequently, in step 541, 542, 543, data and/or voice ensues between PSTN 185 and SIP user agent 165.

Consequently, a voice signal is preferably received from PSTN 185 at PBX 110, PBX 110 preferably issues the PDSV voice to SAM 130, SAM 130 preferably translates the PDSV voice to IP voice, and SAM 130 then preferably transmits the IP voice to SIP user agent 165. Likewise, SIP user agent 165 preferably transmits suitable IP voice to SAM 130, SAM 130 preferably translates the IP voice into PDSV voice, SAM 130 preferably issues the PDSV voice to PBX 110 and PBX 110 preferably delivers a voice signal to PSTN 185. The transfer of information here preferably occurs in a manner that is transparent to PSTN 185 and SIP user agent 165. In addition, suitable digital encryption and signature techniques conventional in the art may be employed to assure authorized access to data, and to further ensure that the data are authentic.

Figure 6:
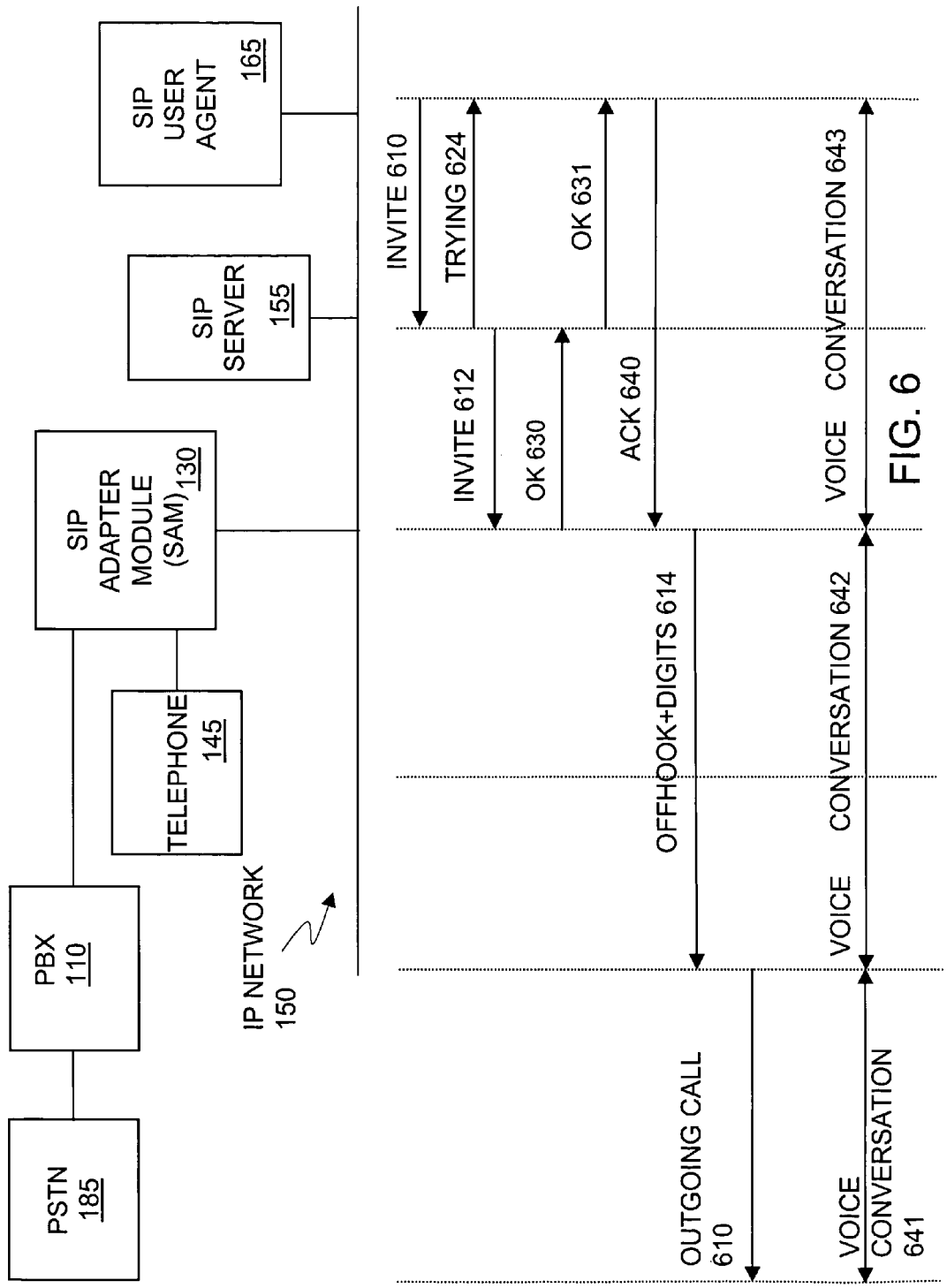
FIG. 6 is a functional block diagram of a process for a call from a SIP User Agent to be gatewayed as an outgoing call to a PSTN by a SAM according to one embodiment of the invention.

FIG. 6 is a functional block diagram of a process for a call from a SIP User Agent to be gatewayed as an outgoing call to a PSTN by a SAM according to one embodiment of the invention. In step 610, SIP server 155 receives a SIP signal from SIP user agent 165, preferably requesting to be connected to PSTN 185. SIP server 155 uses the INVITE information contained in the INVITE message of step 610 to determine a most correct address to which to route the connection request. The INVITE message of step 610 may, for example, include standard routing information in the "From:", "To:", "Contact:" and/or other fields within the INVITE message header.

SIP server 155 accepts the SIP INVITE message of step 610 and, in step 624, preferably transmits a SIP TRYING message to SIP user agent 165 to indicate that an action is being taken on behalf of the call. SIP server 155, preferably concurrently with the SIP TRYING message in step 624, issues a SIP INVITE message to SAM 130 in step 612. In step 630, SAM 130 preferably responds to the SIP server 155 INVITE message of step 612 with a SIP OK message and therefore SIP server 155 responds to SIP user agent 165 with an SIP OK message in step 631. To verify the connection between SIP user agent 165 and SAM 130, SIP user agent 165 sends an SIP acknowledgement (ACK) message to SAM 130 in step 640. Consequently, in step 614, SAM 130 issues an appropriate PDSV OFFHOOK+DIGITS code to PBX 110 to notify PBX 110 that a message has been received by SAM 130 from SIP user agent 165 and that PBX 110 should place a call through the PSTN 185 to the dialed number. In step 610, PBX 110 initiates an outgoing call to the PSTN and once the outgoing call in step 610 has been received by PSTN 185, voice ensues between SIP user agent 165 and PSTN 185 in step 641, 642, 643.

Consequently, IP voice is preferably received from SIP user agent 165 at SAM 130, SAM 130 preferably translates the IP voice to a suitable PDSV voice, SAM 130 preferably sends the suitable PDSV voice to PBX 110, and PBX 110 preferably converts the PDSV voice to suitable voice for PSTN 185. Likewise, PSTN 185 preferably sends a voice signal to PBX 110, PBX 110 preferably converts the voice signal to suitable PDSV voice to SAM 130, SAM 130 preferably translates the PDSV voice to an IP voice, and SAM 130 preferably sends the IP voice to SIP user agent 165. The transfer of information here preferably occurs in a manner that is transparent to the SIP user agent 165, PBX 110, and PSTN 185. In addition, suitable digital encryption and signature techniques conventional in the art may be employed to assure authorized access to data, and to further ensure that the data are authentic.

Figure 7:
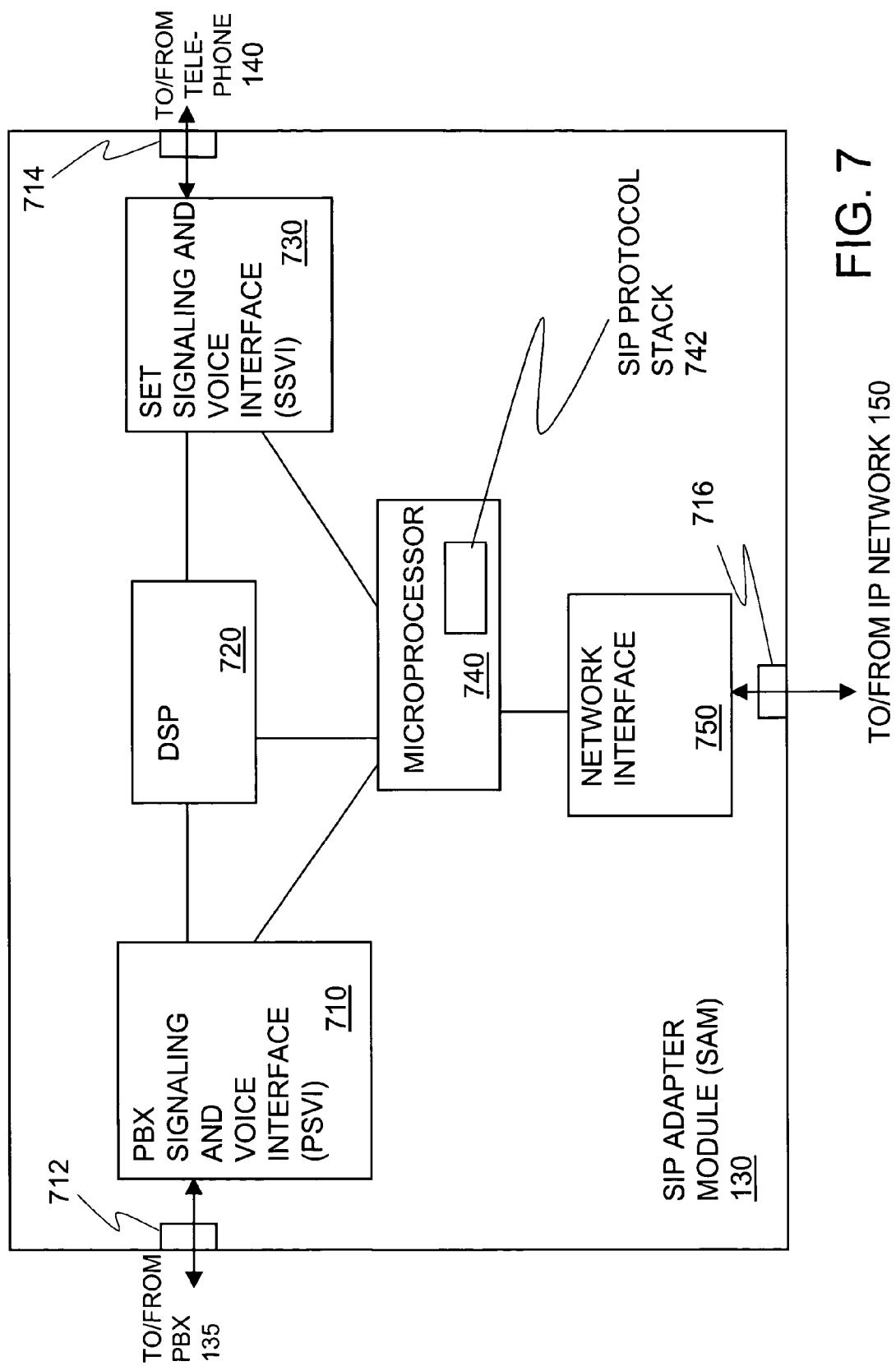
FIG. 7 is a functional block diagram of the SAM processing module.

FIG. 7 is a functional block diagram of the SAM processing module. SAM 130 preferably includes a PBX signaling and voice interface (PSVI) 710, a Set Signaling and Voice Interface (SSVI) 730, digital signal processor (DSP) 720, Microprocessor 740, and Network Interface 750. The Microprocessor 740 preferably includes a SIP protocol stack 742, for translating PDSV signaling to/from SIP messages using traditional table lookup and/or algorithmic. The translation allows telephone 145 and PSTN 185 to take advantage of the various SIP services 156 that are provided by the SIP server 155 while also taking advantage of the full host of functionalities provided by PBX 110. The translation between a SIP messages and a PDSV signaling allows SIP user agent 165 access to the full range of functionalities provided by PBX 110, while also taking advantage of the various SIP services 156 provided by the SIP server 155.

In one embodiment, the set signaling and voice interface (SSVI) 730 preferably receives a PDSV signaling and voice from telephone 145 over communications port 714. SSVI 730 may consist of application-specific integrated circuits (ASICs) and/or software stacks within a suitable machine. The PDSV voice is transmitted to DSP 720 for preferably translating into an IP voice and/or the like. The PDSV signaling is preferably transmitted to Microprocessor 740 for processing. The SIP protocol stack 742 within the Microprocessor 740 is preferably invoked for translating the received PDSV signaling into a SIP messages. Microprocessor 740 may also use other logic to translate between a PDSV and IP. The PDSV signaling may be translated into and included, for instance, within the body of a SIP invite message, request message, response message, informational message, instant message, and/or the like. A SIP message is then preferably transmitted via the Network Interface 750 to communications port 716 for transmission over the IP Network 150.

Network Interface 750 may further receive a SIP message on communications port 716 from IP network 150 for translation by Microprocessor 740. In this regard, the SIP Protocol Stack 742 preferably receives the SIP signal message. Upon translation into PDSV signaling, Microprocessor 740 forwards the communication to the appropriate destination. In this case, the signaling is preferably destined for telephone 145. Therefore Microprocessor 740 preferably forwards the PDSV signaling to SSVI 730 for transmitting to telephone 145 on communications port 714. SSVI 730 may consist of application-specific integrated circuits (ASICs) and/or software stacks within a suitable machine.

In another embodiment, the PBX signaling and voice interface (PSVI) 710 preferably receives a PDSV signaling and voice from PBX 110 over communications port 712. PSVI 710 may consist of application-specific integrated circuits (ASICs) and/or software stacks within a suitable machine. The PDSV voice is preferably transmitted to DSP 720 for translation into IP voice. The PDSV signaling is preferably transmitted to Microprocessor 740 for processing. The SIP protocol stack 742 within the Microprocessor 740 is preferably invoked for translating the received PDSV signaling into a SIP messages. Microprocessor 740 may also use other logic to translate between PDSV and IP. The PDSV signaling may be translated into and included, for instance, within the body of a SIP invite message, request message, response message, informational message, instant message, and/or the like. A SIP message is then preferably transmitted via the Network Interface 750 to a communications port 716 for delivery over the IP Network 150.

The Network Interface 750 may further receive a SIP message on communications port 716 from IP Network 150 for translation by Microprocessor 740. In this regard, the SIP Protocol Stack 742 preferably receives the IP signal. Upon translation into a PDSV signaling, Microprocessor 740 forwards the PDSV signal to the appropriate destination. In this case, the code is preferably destined for PBX 110. Therefore Microprocessor 740 preferably forwards the PDSV signaling to PSVI 710 for transmitting to PBX 110 on communications port 712. PSVI 710 may consist of application-specific integrated circuits (ASICs) and/or software stacks within a suitable machine.

In another embodiment, the set signaling and voice interface (SSVI) 730 preferably receives a PDSV signaling or voice from telephone 145 over communications port 714. SSVI 730 may consist of application-specific integrated circuits (ASICs) and/or software stacks within a suitable machine. The PDSV voice is preferably transmitted to DSP 720 for translating into an IP voice. As such, the PDSV signaling is preferably transmitted to Microprocessor 740 for processing where the SIP protocol stack 742 within the Microprocessor 740 is preferably not invoked for translating the received PDSV signal since the communication is destined for PBX 110. The PDSV signal is preferably transmitted via the PSVI 710 to communications port 712 for delivery to PBX 110. PSVI 710 may consist of application-specific integrated circuits (ASICs) and/or software stacks within a suitable machine.

The PSVI 710 may further receive PDSV voice from PBX 110 over a communications port 712. PSVI 710 may consist of application-specific integrated circuits (ASICs) and/or software stacks within a suitable machine. The PDSV voice is preferably transmitted to DSP 720 for translation into IP voice. The PDSV signal is preferably transmitted to Microprocessor 740 for processing where the SIP protocol stack 742 within the Microprocessor 740 is preferably not invoked for translating the received PDSV signaling into SIP messages since the communication is destined for telephone 145. The PDSV signaling is then preferably transmitted via SSVI 730 to a communications port 714 for delivery to telephone 145. SSVI 730 may consist of application-specific integrated circuits (ASICs) and/or software stacks within a suitable machine.

Figure 8:
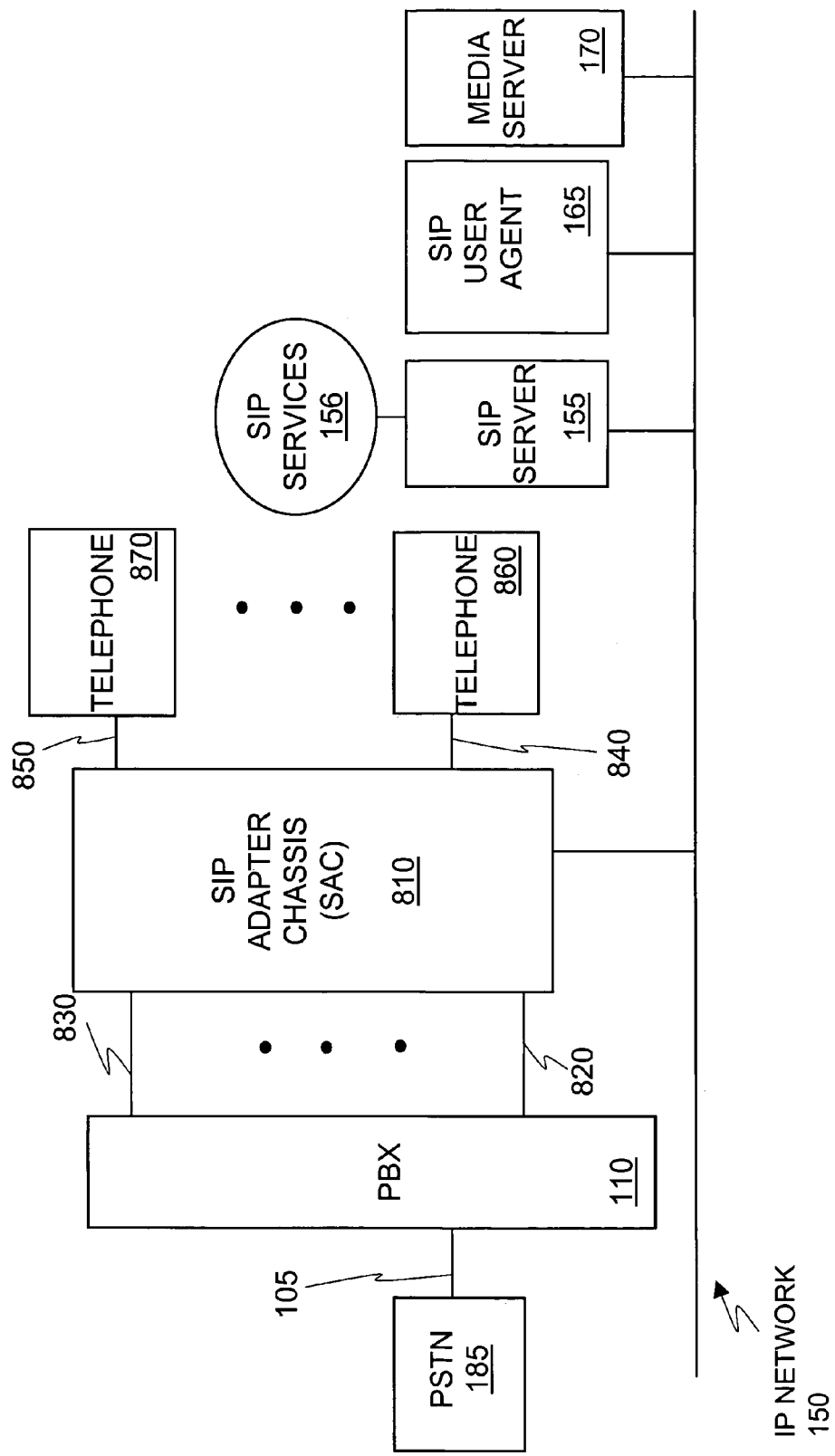
FIG. 8 is a functional block diagram of a SIP Adapter Chassis (SAC) according to one embodiment of the invention.

FIG. 8 is a functional block diagram of a SIP Adapter Chassis (SAC) according to one embodiment of the invention. In furtherance of FIG. 1, in a configuration with a plurality of SAMs, the plurality of SAMs may be located within a SIP Adapter Chassis (SAC) 810. In FIG. 8, SAC 810 contains a plurality of SAMs wherein resources within the SAC 810 are preferably shared to accomplish the above mentioned tasks for the various embodiments. SAC 810 has a plurality of inputs 820, 830 and a plurality of outputs 840, 850 leading to telephone 860, 870.

Although this invention has been described in certain specific embodiments, those skilled in the art will have no difficulty devising variations which in no way depart from the scope and spirit of the present invention. It is therefore to be understood that this invention may be practiced otherwise than is specifically described. For example, although the above embodiments have been described with respect to the SIP protocol, a person skilled in the art should recognize that any other TCP/IP application layer (Layer 4) control protocol known in the art may be used instead of SIP, such as, for example, H.323, MGCP, or the like. The described embodiments are therefore not limited to the use of SIP messages. Thus, the present embodiments of the invention should be considered in all respects as illustrative and not restrictive, the scope of the invention to be indicated by the appended claims and their equivalents rather than the foregoing description.

What is claimed is:

1. A telephony communications network comprising:
a communications interface receiving an application layer control protocol message transmitted directly by a first telephony unit;
an adapter coupled directly to the communications interface, the adapter translating the application layer control protocol message into a telephony signaling code; and
a second telephony unit coupled directly to the adapter for receiving the telephony signaling code wherein the adapter further comprises: a network interface for receiving the application control protocol message transmitted by the first telephony unit, a processor connected to the network interface for translating the application control protocol message into the telephony signaling code and a signaling interface connected to the processor for forwarding the telephony signaling code to the second telephony unit.

2. The network of claim 1, wherein the adapter unit allows the first telephony unit access to private branch exchange functionality associated with the application layer control protocol message.

3. The network of claim 1 further comprising a server for routing the application layer control protocol message transmitted by the first telephony unit.

4. The network of claim 3, wherein the server allows the first telephony unit access to SIP server functionality associated with the application layer control protocol message.

5. The network of claim 3, wherein the server provides a third party service for the first telephony unit.

6. The network of claim 3, wherein the server provides a third party service for the second telephony unit.

7. The network of claim 1, wherein the application layer control protocol message is a Session Initiation Protocol (SIP) message.

8. The network of claim 1, wherein the application layer control protocol message is a Real-Time Transport Protocol (RTP) for media exchange.

9. The network of claim 1, wherein the application layer control protocol message is a Session Initiation Protocol (SIP) message and a Real-Time Transport Protocol (RTP) for media exchange.

10. The network of claim 1, wherein the telephony signaling code is a private digital signaling and voice (PDSV) to exchange signaling and voice.

11. The network of claim 1, wherein the first telephony unit is a SIP user agent.

12. The network of claim 1, wherein the second telephony unit is a digital telephone.

13. The network of claim 1, wherein the adapter is a Session Initiation Protocol (SIP) Adapter Module.

14. A method for communicating over a telephony communications network, the method comprising:
receiving at a communications interface an application layer control protocol message transmitted directly by a first telephony unit;
translating the application layer control protocol message into a telephony signaling code at an adapter coupled directly to the communications interface;
transmitting the telephony signaling code to a second telephony unit coupled directly to the adapter; and
receiving the telephony signaling code at the second telephony unit wherein the adapter further comprises: a network interface for receiving the application control protocol message transmitted by the first telephony unit, a processor connected to the network interface for translating the application control protocol message into the telephony signaling code and a signaling interface connected to the processor for forwarding the telephony signaling code to the second telephony unit.

15. The method of claim 14, further comprising accessing private branch exchange functionality associated with the application layer protocol message.

16. The method of claim 14 further comprising routing the application layer control protocol message transmitted by the first telephony unit.

17. A telephony communications network comprising:
a communications interface receiving an application layer control protocol message transmitted directly by a first telephony unit;
an adapter coupled directly to the communications interface, the adapter translating the application layer control protocol message into a telephony signaling code;
a second telephony unit coupled directly to the adapter for receiving the telephony signaling code; and
a server for routing the application layer control protocol message transmitted by the first telephony unit wherein the server provides a third party service for the first telephony unit.

18. A telephony communications network comprising:
a communications interface receiving an application layer control protocol message transmitted directly by a first telephony unit;
an adapter coupled directly to the communications interface, the adapter translating the application layer control protocol message into a telephony signaling code;
a second telephony unit coupled directly to the adapter for receiving the telephony signaling code; and
a server for routing the application layer control protocol message transmitted by the first telephony unit wherein the server provides a third party service for the second telephony unit.

* * * * *